United States Patent
Beisel et al.

(10) Patent No.: US 9,022,058 B2
(45) Date of Patent: May 5, 2015

(54) PARTICULATE-TOLERANT VALVE COMPRISING ONE OR MORE RECESSES CAPABLE OF CONTAINING THE PARTICULATE

(75) Inventors: Joseph A. Beisel, Duncan, OK (US); Lawrence A. Herndon, Duncan, OK (US)

(73) Assignee: Halliburton Energy Services, Inc, Houston, TX (US)

( * ) Notice: Subject to any disclaimer, the term of this patent is extended or adjusted under 35 U.S.C. 154(b) by 275 days.

(21) Appl. No.: 13/418,957

(22) Filed: Mar. 13, 2012

(65) Prior Publication Data
US 2013/0240063 A1  Sep. 19, 2013

(51) Int. Cl.

| | |
|---|---|
| F16K 3/36 | (2006.01) |
| F16K 25/00 | (2006.01) |
| F16K 25/04 | (2006.01) |
| F16K 3/02 | (2006.01) |
| F16K 5/02 | (2006.01) |
| F16K 5/04 | (2006.01) |
| F16K 5/06 | (2006.01) |

(52) U.S. Cl.
CPC .............. *F16K 25/005* (2013.01); *F16K 25/04* (2013.01); *F16K 3/0263* (2013.01); *F16K 5/025* (2013.01); *F16K 5/045* (2013.01); *F16K 5/0657* (2013.01)

(58) Field of Classification Search
CPC ....... F16K 25/005; F16K 25/02; F16K 25/04; F16K 5/045; F16K 5/0657; F16K 5/025; F16K 3/0263; F16K 3/36

USPC ......... 251/368, 314, 326–328, 333, 359, 360, 251/172, 193, 195, 196; 137/246–246.12, 137/246.22
See application file for complete search history.

(56) References Cited

U.S. PATENT DOCUMENTS

| | | | | |
|---|---|---|---|---|
| 1,416,431 | A * | 5/1922 | Wilson ..................... | 137/246.21 |
| 3,105,048 | A * | 9/1963 | Bobrowsky ................... | 508/109 |
| 3,180,351 | A * | 4/1965 | Wolfensperger ......... | 137/246.18 |
| 3,213,024 | A * | 10/1965 | Blake et al. ..................... | 508/116 |
| 4,519,582 | A * | 5/1985 | Freeman ........................ | 251/328 |
| 4,625,942 | A * | 12/1986 | Nelson .......................... | 251/327 |
| 4,878,651 | A * | 11/1989 | Meyer, Jr. ..................... | 251/172 |
| 7,255,328 | B2 * | 8/2007 | Hunter .......................... | 251/326 |
| 2009/0008593 | A1 * | 1/2009 | Song ............................ | 251/359 |

* cited by examiner

*Primary Examiner* — Marina Tietjen
(74) *Attorney, Agent, or Firm* — John W. Wustenberg; Sheri Higgins Law; Sheri Higgins

(57) ABSTRACT

According to an embodiment, a valve comprises: a valve member, wherein the valve member is made from a non-deformable material; a seat, wherein the seat: (A) is made from a non-deformable material; and (B) is positioned adjacent to the valve member; a seal, wherein the seal is created by the interaction between at least a portion of the seat and at least a portion of the valve member and a sealant; and at least one recess, wherein the at least one recess: (A) is located on the inside of the seat or the outside of the valve member; and (B) is capable of containing at least one particulate, wherein the valve is capable of being opened or closed via relative movement of the valve member and the seat.

19 Claims, 5 Drawing Sheets

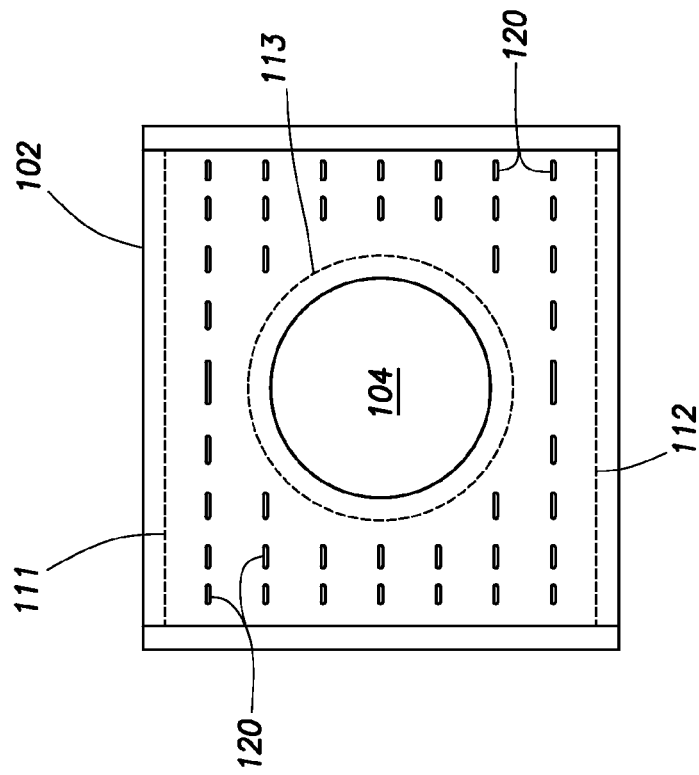
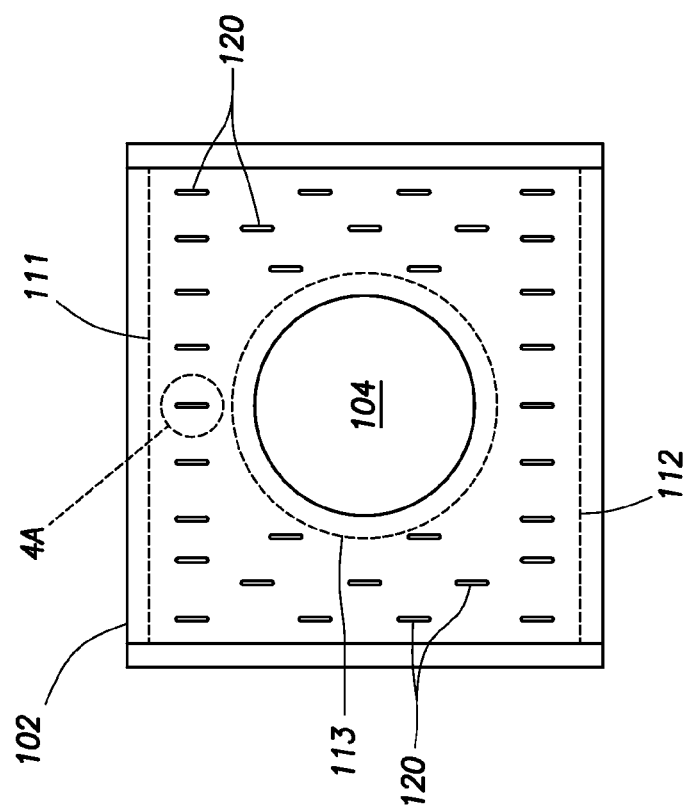

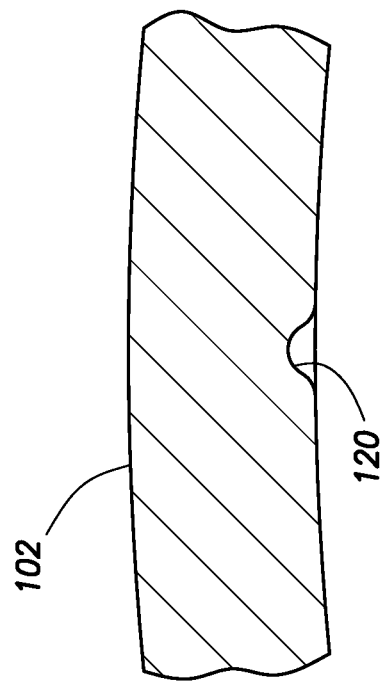
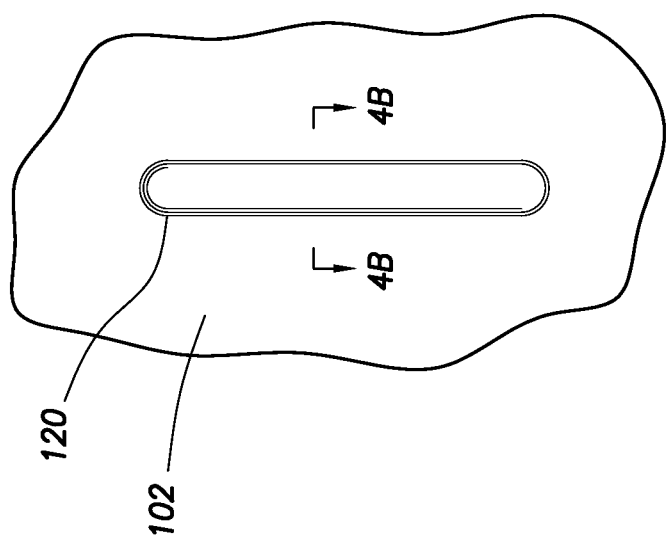
FIG. 4B
FIG. 4A

US 9,022,058 B2

PARTICULATE-TOLERANT VALVE COMPRISING ONE OR MORE RECESSES CAPABLE OF CONTAINING THE PARTICULATE

TECHNICAL FIELD

A valve comprises one or more recesses capable of containing particulate. According to an embodiment, the recesses are positioned within a seal of the valve. The seal can be created by the interaction between a seat, a valve member and a sealant. According to an embodiment, the seat and the valve member are made from a non-deformable material. The valve can be used in oil or gas operations.

SUMMARY

According to an embodiment, a valve comprises: a valve member, wherein the valve member is made from a non-deformable material; a seat, wherein the seat: (A) is made from a non-deformable material; and (B) is positioned adjacent to the valve member; a seal, wherein the seal is created by the interaction between at least a portion of the seat and at least a portion of the valve member and a sealant; and at least one recess, wherein the at least one recess: (A) is located on the inside of the seat or the outside of the valve member; and (B) is capable of containing at least one particulate, wherein the valve is capable of being opened or closed via relative movement of the valve member and the seat.

BRIEF DESCRIPTION OF THE FIGURES

The features and advantages of certain embodiments will be more readily appreciated when considered in conjunction with the accompanying figures. The figures are not to be construed as limiting any of the preferred embodiments.

FIGS. 3A-3D depict various examples of spacing, arrangement, and shapes of recesses.

FIG. 4A is an enlarged view of one of the recess depicted in FIG. 3A.

FIG. 4B is a cross-section of the recess as indicated in FIG. 4A.

DETAILED DESCRIPTION

Figure 1:
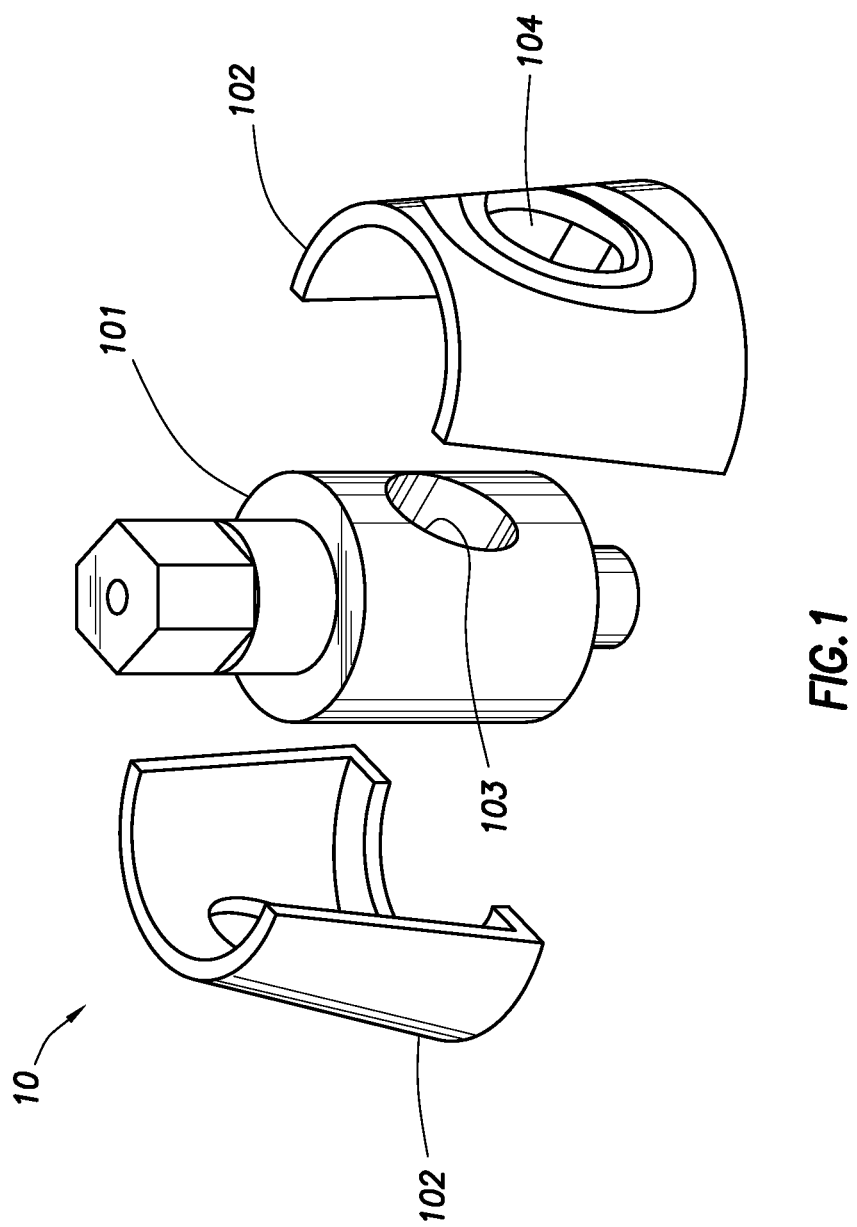
FIG. 1 depicts a portion of a plug valve as an example of a type of valve according to the embodiments.

As used herein, the words "comprise," "have," "include," and all grammatical variations thereof are each intended to have an open, non-limiting meaning that does not exclude additional elements or steps.

It should be understood that, as used herein, "first," "second," "third," etc., are arbitrarily assigned and are merely intended to differentiate between two or more seats, ports, recesses, etc., as the case may be, and does not indicate any particular orientation or sequence. Furthermore, it is to be understood that the mere use of the term "first" does not require that there be any "second," and the mere use of the term "second" does not require that there be any "third," etc.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can include, without limitation, an oil, gas, or water production well, or an injection well. Fluid is often injected into a production well as part of the construction process or as part of the stimulation process. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore.

Valves are commonly used in the oil and gas industry to regulate, direct, or control the flow of a fluid by opening, closing, or partially obstructing various fluid passageways. The oil and gas industry is not the only industry that utilizes valves. Other industries include industrial, military, commercial, residential, transportation, power generation, mining, water reticulation, sewage, chemical manufacturing, automotive, oil refineries, and food processing plants.

The components of a valve often include a body, one or more ports, a stem, an actuator, various gaskets, and one or more components capable of creating a seal, such as a seat and a valve member. The components capable of creating a seal can vary depending on the type of valve. Some seals are created via the interaction between two or more non-deformable components (e.g., metal or metal alloy components).

Examples of valves that commonly include non-deformable components for creating a seal include, but are not limited to, plug valves, gate valves, and ball valves. A plug valve generally includes a metal plug and one or more metal inserts that adjoin the plug. The metal-to-metal interaction between the plug and the insert and a sealant creates a seal. The plug can include a fluid flow path and the insert can contain a port. Rotation of the plug via an actuator can be used to open or close the valve. In the open position, the fluid flow path of the plug at least partially aligns with the port of the insert, thereby allowing fluid flow through the valve. In the closed position, the fluid flow path of the plug is at least partially offset from the port of the insert thereby inhibiting or preventing fluid flow through the valve.

A gate valve generally includes a metal gate and one or more metal seats that adjoin the gate. The gate can be located between a first seat and a second seat. The metal-to-metal interaction between the gate and the seat and a sealant creates a seal. The gate is generally a solid piece of metal and the seat generally includes a port. Linear movement of the gate can be used to open or close the valve. In the open position, the port of the seat is at least partially unobstructed by the gate thereby allowing fluid flow through the valve. In the closed position, the port of the seat is at least partially obstructed thereby inhibiting or preventing fluid flow through the valve.

A ball valve is similar to a plug valve and generally includes a metal ball and one or more metal seats. The metal-to-metal interaction between the ball and the seat and a sealant creates a seal. The ball includes a port. Rotation of the ball via the actuator can be used to open or close the valve. In the open position, the port of the ball at least partially aligns with the flow path through the body of the valve, thereby allowing fluid flow through the valve. In the closed position, the port of the ball is misaligned with the flow path through the body, thereby inhibiting or preventing fluid flow through the valve.

A valve can become contaminated with particulate, such as debris. Contamination can occur for example, during the assembly of the valve, during operations, during storage, and during re-building operations. During the assembly and re-building of a valve, a lubricant is generally introduced into the valve. The lubricant is generally a liquid-based fluid. The liquid portion of the lubricant can be an aqueous liquid or a hydrocarbon liquid. The lubricant can contain undissolved solids, such as Teflon®. The liquid lubricant can contain particulate. Moreover, airborne particulate can be present during assembly and re-building operations. During operations of the valve, fluid flowing through the valve can contain particulate; and during storage, the valve can be exposed to particulate. If the valve is exposed to particulate, then the particulate can enter the space between the two or more non-deformable materials making up the seal.

Scratching can occur to one or more of the non-deformable components of the valve during movement of one component relative to the other component if particulate is present. For example, in the case of a plug valve, if particulate is present between the plug and the insert, then the plug, the insert, or both, can become scratched when the plug is moved relative to the insert. By way of another example, in the case of a gate valve, if particulate is present between the gate and the seat, then the gate, the seat, or both, can become scratched when the gate is moved relative to the seat. The component that can become scratched is dependent on the relative hardness of the two components. For example, the insert may be a softer material than the plug. Therefore, if the insert is a softer material than the plug, then the insert is more likely to become scratched via the particulate during relative movement between the two components. However, it is possible for both components to become scratched by the particulate.

Several problems can occur if a component creating the seal becomes scratched. One of the most detrimental problems is that the seal can become compromised, resulting in leakage. Leakage can also occur due to the particulate holding sealing surfaces apart from each other. There are generally one or more sealing areas created by the non-deformable components and a sealant. The sealant can be the lubricant. For example, the areas at the top and bottom of an insert can create sealing areas, and for a circular port, a circumferential area around the port of an insert can create another sealing area when assembled with a plug. The exact dimensions of the sealing areas can differ depending on the design of the components. The seal can be compromised if particulate causes scratches to a sealing area boundary lying adjacent to the perimeter of the insert or to the perimeter of a port. For example, if a scratch connects with the perimeter of an insert, then fluid can flow or leak into the valve body or out of the valve via the scratch.

There exists a need for a particulate-tolerant valve that can accommodate particulate without the seal becoming compromised.

A novel valve includes at least one recess that is designed to contain particulate. The particulate can become trapped in the recess, thus reducing or eliminating scratches to the valve components due to the particulate.

According to an embodiment, a valve comprises: a valve member, wherein the valve member is made from a non-deformable material; a seat, wherein the seat: (A) is made from a non-deformable material; and (B) is positioned adjacent to the valve member; a seal, wherein the seal is created by the interaction between at least a portion of the seat and at least a portion of the valve member and a sealant; and at least one recess, wherein the at least one recess: (A) is located on the inside of the seat or the outside of the valve member; and (B) is capable of containing at least one particulate, wherein the valve is capable of being opened or closed via relative movement of the valve member and the seat.

Any discussion of the embodiments regarding the valve or any component of the valve is intended to apply to all of the apparatus embodiments. Any discussion of a particular component of an embodiment (e.g., a seat or a recess) is meant to include the singular form of the component and also the plural form of the component, without the need to continually refer to the component in both the singular and plural form throughout. For example, if a discussion involves "the recess," it is to be understood that the discussion pertains to one recess (singular) and two or more recesses (plural).

According to an embodiment, the valve is used in a well, for example during well production, well servicing, or well completion. The valve can be, but does not need to be, used in oil or gas operations, such as production or injection techniques. Other applications where the valve may be used include, but are not limited to, industrial, military, commercial, residential, transportation, power generation, mining, water reticulation, sewage, chemical manufacturing, automotive, oil refineries, and food processing plants.

Turning to the figures. FIG. 1 depicts a portion of the valve 10. The valve can be a high-pressure or low-pressure valve. The valve includes a valve member 101 and a seat 102. The valve member 101 and the seat 102 are made from a non-deformable material. As used herein, the term "non-deformable" means the material has an elastic modulus greater than or equal to 5 gigapascals (GPa). Elastic modulus (E) is a measure of the tendency of a substance to be deformed elastically (i.e., non-permanently) when a force is applied to it and returned to its normal shape. Elastic modulus is expressed in units of pressure, for example, Pa (Pascals) or dynes/cm$^2$. However, some materials, such as metals and metal alloys have an E of the order of $10^9$ Pa; therefore, E for these materials is commonly expressed in units of GPa. The non-deformable material can comprise at least one metallic element. The non-deformable material can be made from only a single metallic element or it can be an alloy. An alloy is a mixture containing at least one metallic element and at least one other metallic element or a non-metallic element. According to an embodiment, the metallic element is selected from the group consisting of, stainless steel, nickel, brass, bronze, copper, inconel, monel, chrome, stainless steel alloys, alloy steels, carbon steels, nickel-based alloys, copper-based alloys, aluminum alloys, cobalt-based alloys, titanium, tantalum, tungsten and tungsten alloys, and zinc alloys. The non-deformable material is preferably resistant to corrosion.

The valve further comprises a seal, wherein the seal is created by the interaction between at least a portion of the seat 102 and at least a portion of the valve member 101 and a sealant. The sealant can be a lubricant. The sealant can be any type of fluid that is capable of aiding the valve member and the seat in creating the seal. The sealant can be a liquid. The liquid can be an aqueous liquid or a hydrocarbon liquid. The sealant can also contain undissolved solids, such as Teflon®. The seal can also be created by an entire surface of the seat 102 and an entire surface of the valve member 101. According to an embodiment, the interaction is between at least a portion of the inside of the seat 102 and at least a portion of the outside of the valve member 101. The interaction can also be between the inside of the seat 102 and the inside of the valve member 101. The interaction can also be between at least a portion of the valve member 101 and at least a portion of two or more seats 102, or between the outside or a portion of the outside of the valve member 101 and the insides or a portion of the insides of the two or more seats 102. According to another embodiment, the interaction is a metal-to-metal interaction. As used herein, the term "metal" means a substance that is made from a single metallic element, a substance that is made from two or more metallic elements, or a substance that is made from a single metallic element and a non-metallic element. Examples of valves that include a metal-to-metal interactions include, but are not limited to, a plug valve, a gate valve, and a ball valve.

The valve member 101 can be a plug, a gate, and a ball. The valve member 101 can comprise a fluid flow path 103. Fluid is capable of flowing through the fluid flow path 103. The fluid flow path 103 can be a variety of shapes including, but not limited to, circular, pyramidal, rectangular, or curlicue. Examples of valve members 101 that commonly include a fluid flow path 103 include a plug and a ball.

The valve comprises the seat 102. According to an embodiment, the valve comprises more than one seat 102. The seat 102 is positioned adjacent to the valve member 101. The seat 102 can comprise a port 104. Fluid is capable of flowing through the port 104. The ports can be a variety of shapes including, but not limited to, circular, pyramidal, or rectangular.

The valve is capable of being opened or closed via relative movement of the valve member and the seat. The movement can be a linear or rotational movement of the valve member 101 relative to the seat 102. The linear movement can be vertical or lateral movement. As used herein, the term "open" and all grammatical variations thereof means the amount of fluid entering the valve (e.g., via a port 104 or a fluid flow path 103) increases. It is to be understood that "opening" the valve does not require that the port 104 or the fluid flow path 103 be completely unobstructed by a component, for example, the valve member 101, but rather, the amount of fluid entering the valve increases. There can be some fluid flow into the valve prior to opening the fluid flow path, and after opening, the amount of fluid flowing into the path increases. As used herein, the term "close" and all grammatical variations thereof means the amount of fluid entering the valve decreases. It is to be understood that "closing" the valve does not require that the port 104 or the fluid flow path 103 be completely obstructed by a component, for example, the valve member 101, but rather, the amount of fluid entering the valve decreases. There can be some fluid flow into the valve after closing the valve, and there can also be no fluid flow into the valve after closing.

The valve can further comprise additional components (not shown), such as a body, a bonnet, an actuator, a stem for transmitting motion from the actuator to the valve member 101, one or more gaskets and/or O-rings, springs, washers, nuts, and bolts.

Figure 2:
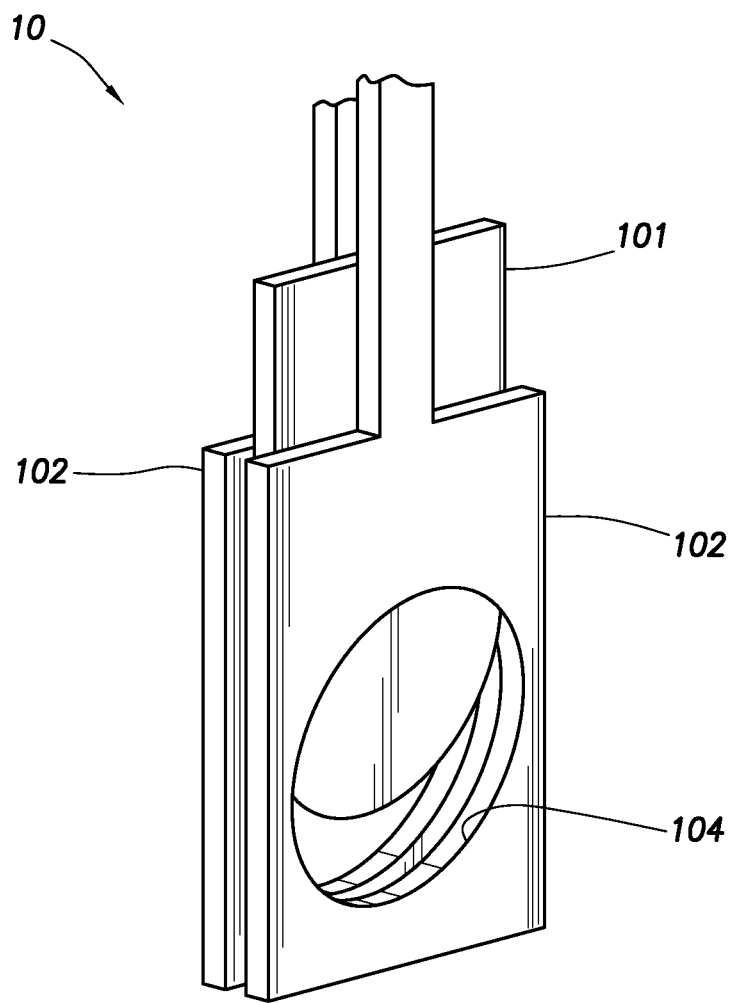
FIG. 2 depicts a portion of a gate valve as another example of a type of valve according to the embodiments.

FIGS. 1 and 2 illustrate two types of valves according to the embodiments. The principles described below are equally applicable to any type of valve that comprises a seat and a valve member made from a non-deformable material. The examples of these two types of valves are not the only examples that could be given, and are not intended to limit the scope of the invention. FIG. 1 depicts the valve according to an embodiment. FIG. 1 depicts a plug valve. An example of a high-pressure plug valve is the LO TORC® plug valve, marketed by Halliburton Energy Services, Inc. The valve member 101 is a plug. The valve member 101 comprises a fluid flow path 103. The valve includes two seats 102. The seats 102 are commonly referred to as inserts. The seats 102, when assembled together, are cylindrical in shape. The inner diameter of the seats 102 can be straight or tapered. The outer diameter of the seats 102 can be straight or tapered. The assembled seats 102 comprise a first end and a second end.

Each seat 102 can further comprise a port 104, e.g., a first port and a second port. The plug valve can be opened or closed via rotational movement of the valve member 101 relative to the seats 102. The valve member 101 can be rotated to at least partially align the ports 104 of the seats 102 with the fluid flow path 103 of the valve member 101 to open the valve. In the open position, fluid can enter the valve through a first port 104 of one of the seats 102, flow through the fluid flow path 103 of the valve member 101, and exit the valve through a second port 104 of the other seat 102. The valve member 101 can also be rotated such that the ports 104 of the seats 102 are misaligned with the fluid flow path 103 of the valve member 101 to close the valve. In the closed position, fluid is inhibited or prevented from entering the valve via the first or the second port 104.

When the plug valve is assembled, the interaction between the inside of the seats 102 and the outside of the valve member 101 create the seal. Preferably, the seal created by the interaction of the seats 102 and the valve member 101 maintains fluid flow in only a first or second direction through the valve via the ports 104 and the fluid flow path 103 of the valve member 101. The seal can have one or more sealing areas to maintain the direction of fluid flow. For example, and as depicted in FIGS. 3A-3D, the plug valve can contain four sealing areas; a first sealing area 111 located at the first end of the seats 102, a second sealing area 112 located at the second end of the seats 102, a third sealing area 113 located around the perimeter of the first port of one seat 102, and a fourth sealing area (not shown) located around the perimeter of the second port of the other seat 102. The seal can prevent fluid from leaking out from the sealing areas.

FIG. 2 is an example of a gate valve. The valve member 101 is a gate. The valve member 101 can be a variety of shapes including, but not limited to, circular, pyramidal, or rectangular. The valve member 101 can be solid (i.e., without comprising a fluid port or flow path). The gate valve includes one or more seats 102. The seat 102 can be circular, pyramidal, or rectangular in shape. The seat 102 can further comprise a port 104. The port 104 can be a variety of shapes including, but not limited to, circular, pyramidal, or rectangular. The gate valve can be opened or closed via linear movement of the valve member 101 relative to the seat 102. For example, the linear movement can be vertical or lateral movement of the valve member 101 relative to the seat 102. The valve member 101 can be moved in a linear direction to at least partially expose the port 104 of the seat 102 to open the valve. In the open position, fluid can enter the valve through at least one port 104. The fluid can also enter the valve via a first port 104 of one seat 102, flow through the valve, and exit the valve through a second port 104 of another seat 102. The valve member 101 can also be moved in a linear direction to at least partially obstruct the port 104 of the seat 102 to close the valve. In the closed position, fluid is inhibited or prevented from entering the valve via the port 104.

When the gate valve is assembled, the interaction between the inside of the seat 102 and the outside of the valve member 101 creates the seal. Preferably, the seal created by the interaction of the seat 102 and the valve member 101 maintains fluid flow in only a first or second direction through the valve via the port 104. The seal can have one or more sealing areas (not shown) to maintain the direction of fluid flow. For example, the gate valve can contain two or more sealing areas; a first sealing area located around the perimeter of the seat 102, a second sealing area located around the perimeter of a first port 104 of one seat 102, and possibly a third sealing area located around the perimeter of the second port 104 of the another seat 102. The seal can prevent fluid from leaking out from the sealing areas.

The valve includes at least one recess 120. According to an embodiment, the valve comprises two or more recesses 120. According to another embodiment, the valve comprises multiple recesses 120. Preferably, the recess 120 is located within the seal. For example, the recess 120 can be located on the inside of the seat 102 or the outside of the valve member 101. The recesses 120 can be located on both, the seat 102 and the valve member 101. For example, one or more recesses 120 can be located on the inside of the seat 102 and one or more recesses can be located on the outside of the valve member 101.

The recess 120 is capable of containing at least one particulate. One or more recesses can also be capable of containing multiple particulates. As used herein, the term "contain" means the particulate can fit within the recess and once within the recess, the particulate is substantially inhibited, and preferably prevented, from becoming dislodged from the recess due to movement of the valve or operation of the valve. By way of example, the recess can have dimensions that are greater than the largest cross-sectional area of the particulate, which allows the particulate to fit within the recess; however, the dimensions are not so great as to allow the particulate to enter the recess and then easily exit from the recess due to fluid flow within the valve. One reason why it is beneficial to have the particulate contained in the recess is that after containment, the particulate is not able to move about the valve and cause scratches to one or more components (such as the seat or the valve member). As used herein, the term "particulate" means a small discrete mass of solid matter.

The particulate can enter the valve and also the seal via a fluid flowing into the valve, for example, during operation of the valve, assembly of the valve, storage, or re-building of the valve. Examples of particulate include, but are not limited to: proppant in a fracturing fluid; gravel in a gravel packing fluid; undissolved solids in a cement slurry, a drilling fluid, an injection fluid, or a reservoir fluid; airborne solids, including dust; and solids contained in liquids, such as a lubricant. The particulate can have a size in the range of about 1 micrometer to about 64 millimeters. Reference to the "size" of the particulate means the dimensions of the largest cross-sectional area of the particulate. The size of the particulate can vary. For example, proppant is commonly sand-sized, having a largest cross-sectional area size in the range of about 0.0625 millimeters up to 2 millimeters (mm). The next smaller particle-size class below sand is silt, which is defined as having a largest dimension ranging from less than 0.0625 mm down to 0.004 mm. The next larger particle-size class above sand is gravel, which is defined as having a largest dimension ranging from greater than 2 mm up to 64 mm. Airborne solids that are capable of settling out of the air commonly range from about 1 micrometer (μm) to greater than 100 μm. The multiple particulates can have the same size or different sizes. By way of example, a fluid can contain proppant, silt, and airborne solids. By way of another example, the fluid can contain only proppant wherein the size of the proppant varies (i.e., some of the proppant has a first size, some of the proppant has a second size, some of the proppant has a third size, and so on). According to an embodiment, the recess 120 is capable of containing more than one particulate in more than one size. For example, the recess 120 can be capable of containing at least one particulate having a first size and also capable of containing at least one particulate having a second size.

The recess 120 can have a variety of shapes. According to an embodiment, the shape of the recess 120 is selected from the group consisting of circular, ovular, polygonal (including triangular, square, rectangular, pentagonal, etc.). If there is more than one recess 120, then the shape of the recesses 120 can be the same or different.

According to an embodiment, the dimensions of the perimeter of the recess 120 is selected such that the recess 120 is capable of containing at least one particulate, preferably more than one particulate. Depending on the shape of the recess 120, the perimeter can include length, width, a base, or a side. For example, the width of the recess can be selected to contain a particulate having a largest dimension of 2 mm. According to this example, the width of the recess may be selected to be slightly greater than 2 mm (e.g., 2.2 mm), so long as the recess is capable of containing the particulate. The dimensions of the perimeter of the recess 120 can be in the range of about 0.25 inch to about 4.0 inches, preferably about 0.38 inch to about 2.5 inches.

The recess 120 also has a depth. According to an embodiment, the depth of the recess 120 is less than a depth that spans the entire thickness of the seat 102 or the valve member 101. By way of example, if the thickness of the seat 102 is 1 inch, then the depth of the recess 120 is less than 1 inch. According to another embodiment, the depth of the recess 120 is in the range of about 20% to about 80%, preferably about 30% to about 50%, of the thickness of the seat 102 or the valve member 101. The depth can be selected such that the recess 120 is capable of containing at least one particulate, preferably more than one particulate. For example, the depth of the recess can be selected to contain a particulate having a largest dimension of 1 mm. According to this example, the depth of the recess may be selected to be about 1 mm (e.g., 0.9 to 1.1 mm), so long as the recess is capable of containing the particulate. The depth can be in the range of about 0.001 inch to about 1.25 inches, preferably about 0.03 inch to about 0.38 inches. The dimensions of the perimeter and the depth can be selected based on the anticipated particulate size. For example, the anticipated particle size can depend on the specific industry making use of the valve (e.g., oil or gas operations, including fracturing operation, cementing operation, or drilling operation).

If there is more than one recess 120, then the dimensions of the perimeter and the depth of the recesses 120 can be the same or different. By way of example, a first recess 120 or set of first recesses can have a first perimeter dimension and depth, while a second recess 120 or set of recesses can have a second perimeter dimension and depth. There can be a third recess or set of recesses having a third perimeter dimension and depth, and so on. As discussed above, there can be multiple sizes of particulate. The first, second, third etc. perimeter dimensions and depths can be selected such that the recesses 120 are capable of containing the multiple sizes of particulate.

According to an embodiment, if there is more than one recess 120, then the recesses are oriented such that the recesses are not touching (i.e., the perimeter of one recess does not touch the perimeter of another recess). According to this embodiment, the recesses 120 can be spaced apart from each other. According to another embodiment, a sufficient distance exists between each recess 120 such that should a particulate create a scratch, then the scratch is contained in the distance between only two recesses. The distance between each recess can also be determined based on the total number of recesses present, the dimensions of the recess, the amount of particulate that is anticipated, the dimensions of the seat and/or valve member, and the spacing pattern. The distance between each recess 120 can be in the range from about 0.03 inch to about 2.0 inches. If there are one or more recesses 120 on the seat 102 and also one or more recesses 120 on the valve member 101, then there can also be the distance between each recess when the valve is assembled.

Figure 3D:
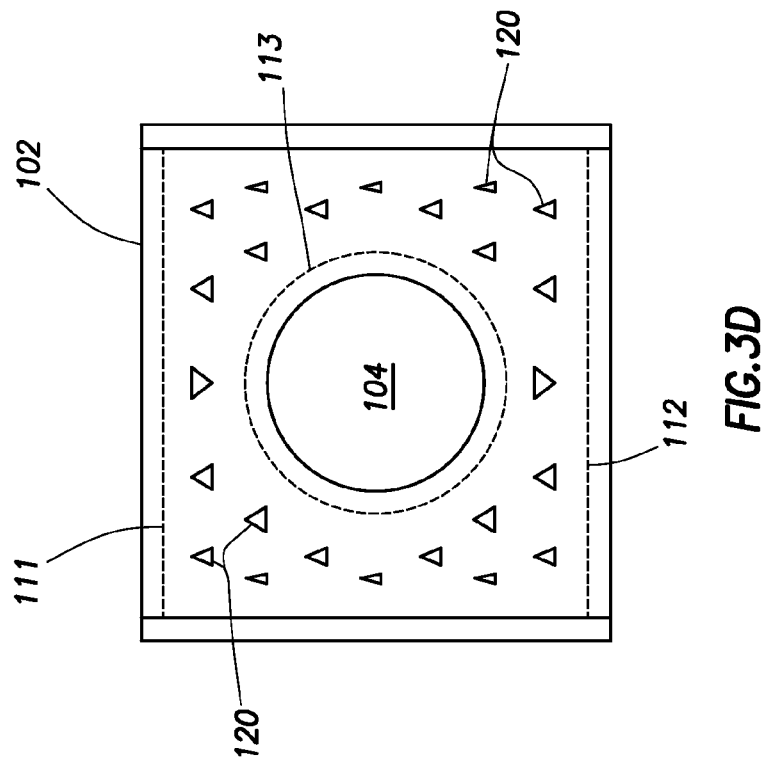
Figure 3C:
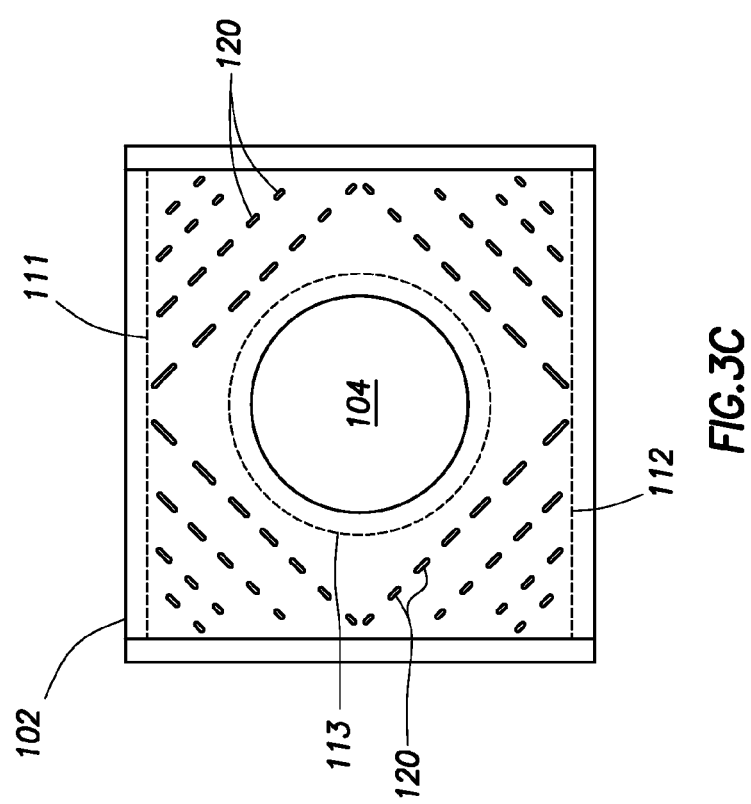

The recesses 120 can be arranged randomly or arranged to form a pattern on the seat 102 and/or valve member 101. The pattern can be selected from the group consisting of, vertical, horizontal, diamond, circular, or elliptical, and combinations thereof. The relative term vertical means at right angles to the plane of an end or tangent of the seat 102 or the valve member 101. The term horizontal means parallel to the plane of an end or tangent of the seat or valve member. The relative terms diamond, circular, or elliptical is used in reference to a port 104 or a fluid flow path 103. By way of example, FIG. 3A depicts a vertical pattern, FIG. 3B depicts a horizontal pattern, FIG. 3C depicts a diamond pattern, and FIG. 3D depicts a random arrangement. According to an embodiment, the arrangement is selected such that if scratching by the particulate occurs to the seat 102 and/or the valve member 101, then the seal is maintained. For example, the arrangement can be selected such that if a scratch occurs, then the scratch is contained in between two recesses. In this manner, the seal is maintained because a fluid flow path in the sealing areas is not created.

The arrangement may also be adjusted based on the relative direction of movement between the seat 102 and the valve member 101 such that the connectivity between two or more recesses 120 due to a scratch is reduced or eliminated. By way of example, the valve member 101 of a plug valve is moved in a rotational direction relative to the seat 102. In this example, if a particulate scratches the inside of the seat 102, then the scratches are likely to occur in a circular path. Therefore, in order to decrease or eliminate the potential connectivity between two or more recesses 120, the arrangement of the recesses may be selected as a random or a diamond pattern. By way of another example, the valve member 101 of a gate valve is moved in a linear direction relative to the seat 102. The linear direction can be vertically or laterally. If the direction is vertically, then scratches are likely to occur in a vertical direction as well. Therefore, the arrangement may be selected as a vertical pattern.

The recesses 120 may have a desired amount of off-set from one another. For example, if the recesses are positioned in a vertical pattern, then a first column of recesses can include a recess in every odd-numbered row, the second column of recesses can include a recess in every even-numbered row, and so on, such that the recesses in row one and two, for example, are off-set from each other. The amount of off-set can be used in conjunction with the spacing and the arrangement to help minimize or eliminate the connectivity between two or more recessed due to a scratch. If recesses 120 are present on both the seat 102 and the valve member 101, then one recess on the seat is preferably off-set from another recess on the valve member. In this manner, when the valve is assembled, the recesses 120 do not abut one another, thus creating connectivity between the recesses.

The total number of recesses 120 located on the seat 102 and/or valve member 101 can vary. The total number can be predetermined. Factors that can be considered in determining the total number of recesses 120 can include the shape of the recess, the perimeter dimensions, the spacing of the recesses, the arrangement of the recesses, the amount of off-set between recesses, the anticipated particulate size to be encountered, and the anticipated volume of particulate to be encountered.

There can be one or more sealing areas created by the interaction between the seat 102 and the valve member 101. Some examples of sealing areas are depicted in FIGS. 3A-3D. For a plug valve, the first sealing area 111 is created at the first end of the seat 102 (insert), the second sealing area 112 is created at the second end of the seat 102, and the third sealing area 113 is created around the perimeter of the port 104 (shown as a circumferential port). The dimensions of the sealing areas can be the same or different. Moreover, the dimensions of all of the sealing areas can vary depending on the specifics of the valve and components thereof. Common sealing area dimensions can range from about 1% to about 85% of the total surface area of the seat. Common heights for horizontal sealing areas and widths for port perimeter sealing areas range from about 0.08 inch to about 1.5 inches. In order to maintain the sealing capability of the interaction between the seat 102 and the valve member 101, preferably a recess 120 is not located within any sealing areas. According to another embodiment, the recesses 120 are positioned such that potential connectivity between a recess and a sealing area due to a scratch is diminished or eliminated. The spacing, pattern, and total number of the recesses 120 can be adjusted with regard to sealing areas (in the same manner as described above regarding the potential connectivity between recesses) to diminish or eliminate the potential connectivity.

According to an embodiment, the recess 120 is designed such that a burr is non-existent. A burr is a raised edge or small pieces of material remaining attached to a workpiece after a modification process (such as during machining of the workpiece). Burrs are undesirable because the burrs can create scratches during the relative movement of the seat 102 and the valve member 101. One way to eliminate burrs is for the edge where the recess 120 joins the surface of the seat 102 or the valve member 101 to be rounded or sloped; for example, if the edge is a straight-sided edge (i.e., 90°), then burrs are likely to exist. However, if the edge is rounded or sloped at an angle of greater than 90°, but less than 180°, then burrs are less likely to exist. FIG. 4A is an enlarged view of one of the recesses 120 depicted in FIG. 3A. FIG. 4B is a cross-sectional view of the recess 120 depicted in FIG. 4A. As can be seen in FIG. 4B, the edges of the recess 120 are sloped.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A valve comprising:
 a valve member, wherein the valve member is made from a non-deformable material;
 a seat, wherein the seat:
  (A) is made from a non-deformable material; and
  (B) is positioned adjacent to the valve member;
 a seal, wherein the seal is created by an interaction between at least a portion of the seat and at least a portion of the valve member and a fluid sealant; and
 two or more recesses, wherein the recesses:
  (A) are located on an inside surface of the seat relative to the valve member, an outside surface of the valve member relative to the seat, or a combination thereof;
  (B) are capable of containing at least one particulate;
  (C) are not interconnected to one another; and
  (D) are off-set circumferentially and axially from one another,
 wherein the valve is capable of being opened or closed via relative movement of the valve member and the seat.

2. The valve according to claim 1, wherein the non-deformable material is made from only a single metallic element or an alloy.

3. The valve according to claim 2, wherein the metallic element or alloy is selected from the group consisting of, stainless steel, nickel, brass, bronze, copper, inconel, monel, chrome, stainless steel alloys, alloy steels, carbon steels, nickel-based alloys, copper-based alloys, aluminum alloys, cobalt-based alloys, titanium, tantalum, tungsten and tungsten alloys, and zinc alloys.

4. The valve according to claim 1, wherein the interaction is between at least a portion of the inside surface of the seat and at least a portion of the outside surface of the valve member.

5. The valve according to claim 1, wherein the interaction is a metal-to-metal interaction.

6. The valve according to claim 1, wherein the valve is a plug valve, a gate valve, or a ball valve.

7. The valve according to claim 1, wherein the valve member comprises a fluid flow path.

8. The valve according to claim 1, wherein the seat comprises a port.

9. The valve according to claim 1, wherein the particulate has a size in the range of about 1 micrometer to about 64 millimeters.

10. The valve according to claim 1, wherein the recesses are-capable of containing more than one particulate.

11. The valve according to claim 1, wherein the dimensions of the perimeter of the recesses is selected such that the recesses are capable of containing the at least one particulate.

12. The valve according to claim 1, wherein the depth of the recesses is selected such that the recesses are capable of containing the at least one particulate.

13. The valve according to claim 1, wherein one or more sealing areas are created by the interaction between the seat and the valve member.

14. The valve according to claim 13, wherein the recesses are located within the one or more sealing areas.

15. The valve according to claim 14, wherein the recesses are located on both, the inside surface of the seat and the outside surface of the valve member.

16. The valve according to claim 14, wherein the recesses are off-set from one another such that if a scratch occurs from a particulate, then the scratch is contained in the distance between only two of the recesses.

17. The valve according to claim 14, wherein the recesses are arranged randomly or arranged to form a pattern on the seat and/or the valve member.

18. The valve according to claim 17, wherein the pattern is selected from the group consisting of vertical, horizontal, diamond, circular, elliptical, or combinations thereof.

19. The valve according to claim 13, wherein the recesses are not located within the one or more sealing areas.

* * * * *